Figure 1:
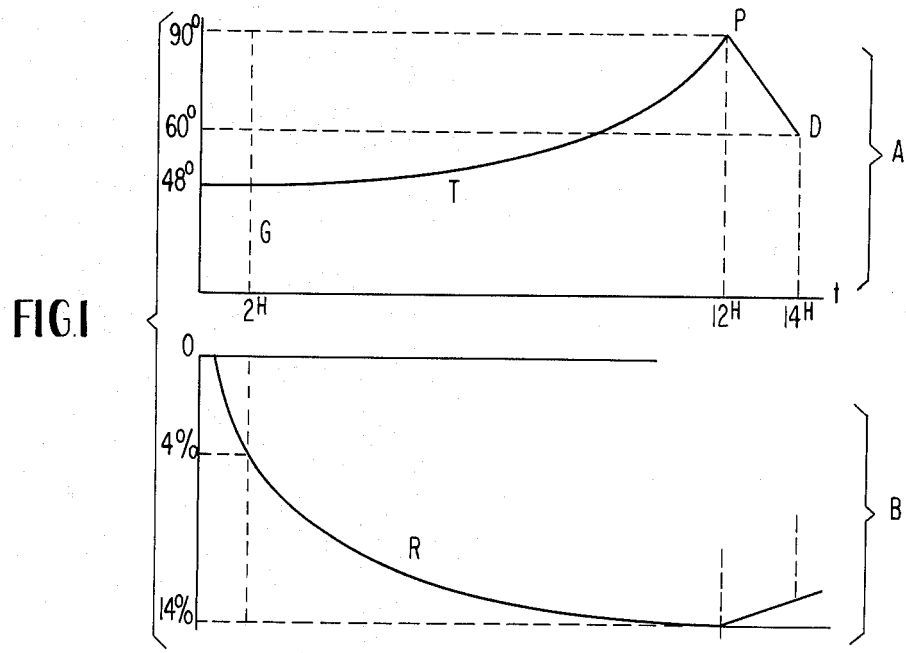

INVENTOR
RENE GRANDPERRET

United States Patent Office 3,222,432
Patented Dec. 7, 1965

3,222,432
METHODS OF PRODUCING OPTICAL AND OPH-
THALMIC LENSES FROM THERMOSETTING
RESIN MATERIALS
René Grandperret, Saint-Maur, Seine, France, assignor to
Lentilles Ophtalmiques Rationnelles, Saint-Maur, Seine,
France, a corporation of France
Original application June 12, 1958, Ser. No. 741,629.
Divided and this application Apr. 8, 1963, Ser. No.
271,109
Claims priority, application France, Apr. 25, 1958,
764,067, Patent 1,204,627
8 Claims. (Cl. 264—1)

This application is a division of application Serial No. 741,629, filed June 12, 1958.

The present invention relates to improvements in the production of optical and ophthalmic lenses from transparent thermosettable resins.

The usual procedure in producing such lenses is to pour the monomer resin into molds, usually glass molds, and then heat the filled molds to a predetermined temperature to polymerize the resin.

In practice however such a process is difficult to carry out successfully and a number of difficulties have to be overcome if lenses having the requisite optical characteristics are to be produced.

One difficulty arises out of the fact that suitable thermosetting resins for optical and ophthalmic lenses, such for example as allyl compounds, e.g. allyl diglycol carbonate, diallyl phthalate, allyl chloroacrylate and the like, will only polymerize if kept completely out of contact with atmospheric air. This condition must be fulfilled even during the period that the material undergoing polymerization is contracting.

With the types of resins used, such contraction is very substantial and may amount to as much as 15% to 20% by volume of the material, and it moreover is non-uniform as between the center and periphery of the lens due to the configuration of the lens. The contraction or shrinkage causes separation of the lens from the mold wall, thereby deforming the lens and moreover allowing air into the mold which is liable to arrest the polymerization process prior to its normal completion. The resulting lens may have to be discarded since no deviation from the prescribed contour of the lens can be tolerated for optical purposes.

A further condition required for successful performance of such processes involves the maintenance of uniform temperature throughout the mass during polymerization, and the fact that the temperature must accurately follow a prescribed, gradually increasing schedule.

Since polymerization is an exothermic reaction, it is essential that the excess heat be dissipated rapidly and spontaneously in order to avoid local heat build-up liable to result in overheating and/or unequal temperature distribution interfering with the satisfactory progress of polymerization.

In order to ensure a permanent contact between the mold and the resin notwithstanding shrinkage of the resin, it has been suggested that a high external pressure be applied to the molds, or alternatively that yielding seals be provided which would yield to the action of atmospheric pressure. Such procedures however have been found unsatisfactory because of the unequal contraction between the central and peripheral areas of the lens.

In order to withstand pressure forces when using glass molds, it is found necessary to provide comparatively thick mold walls. Such mold walls are relatively unyielding, so that the lens breaks away prematurely from the mold surface and is liable to fail. Moreover, a thick walled mold is an obstacle to successful dissipation of excess heat. If on the other hand the mold wall thickness is reduced it is the mold that will tend to fail under the distortion strains imposed on it.

I have discovered that the above difficulties can be successfully overcome in the production of optical and ophthalmic lenses from thermosetting resins, through the use of quenched glass molds having thin walls with parallel faces, for polymerizing the resin.

By quenched or annealed glass I intend to designate glass that has been carried to a temperature of about 700° C. and then quickly cooled to ambient temperature by a jet of air or the like. Glass treated in this way has high impact strength and moreover has the characteristic property that it will break up into non-cutting fragments. More important for the purposes of the invention, the quenching treatment also imparts to the glass increased flexibility and resiliency. Quenched glass is about five times as resilient as unquenched glass of similar type. It is this particular feature which is taken advantage of according to the invention. The thinner the glass sheet the more flexible it is. If the mold is made from elements of quenched glass having a uniform thickness on the order of 4 mm., the mold will readily follow and conform to any shrinkage variations in the material as between the center and periphery of the lens without any separation or breakaway between the mold wall and the resin. Moreover, owing to its low thickness dimension such a mold wall will readily dissipate any excess heat generated during polymerization.

In order to eliminate any distortion undergone by the glass during the quenching treatment it is generally desirable to machine the quenched-glass molds in two stages. In a first stage, prior to quenching, a glass blank is made and its walls are machined to the prescribed curvature and dimensions. The blank is then quenched and again machined to remove the distortion consequent on quenching. The active surfaces of the mold are buffed and polished to their final optical dimensions and curvatures.

By the use of a mold thus produced from quenched glass elements, faultless and uniform production output can be obtained, a result that was not achievable by any of the prior art procedures.

To maintain the proper spacing between the quenched glass mold elements, according to another feature of the invention, the elements are interconnected by a plastic annular seal having a peripheral thickness dimension corresponding to the peripheral thickness of the lens, and made from a material having a softening characteristic such that it will permit of the two walls of the mold to move in towards each other by an amount at least large enough to compensate for the contraction of the thermosetting resin during polymerization.

The seal may be retained in place throughout the polymerization. Alternatively however, and this in some cases will be the more desirable procedure, the seal may be removed after the resin has set to a gel and before it has polymerized. In such case there may be applied to the peripheral surface of the lens uncovered on removal of the seal, a coating of monomer or other suitable material which will not polymerize in contact with the atmosphere and will thus provide a lateral seal preventing any break-away of the lens from the mold walls.

Figure 2:
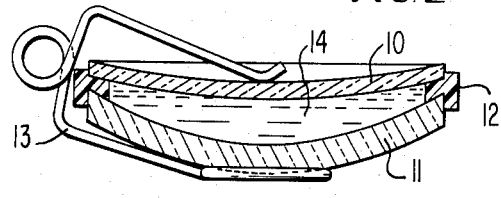
Figure 3:
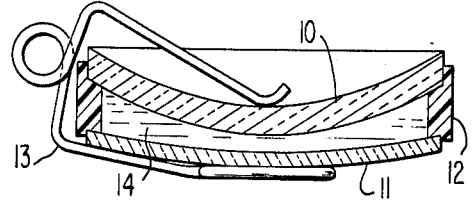
Figure 4:
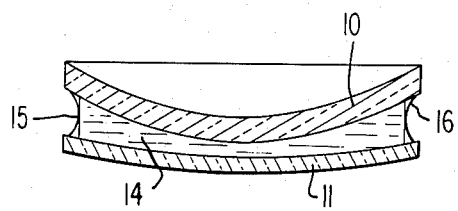
Figure 5:
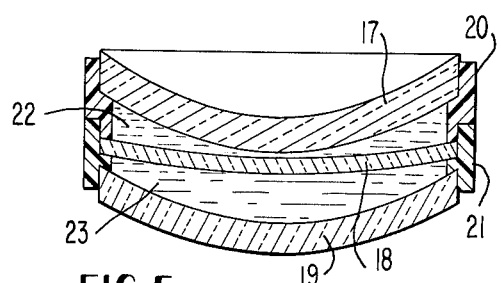

The invention will now be described in greater detail with reference to the accompanying drawings, wherein:

FIG. 1 is a temperature chart;
FIG. 2 illustrates in cross section a mold assembly for making a positive lens;
FIGS. 3 and 4 show successive stages in the manufacture of a negative lens;
FIG. 5 is a similar view of a composite mold assembly for molding a pair of complementary lenses.

For the purposes of the ensuing exemplary description it is assumed that the lenses are made from allyl diethylene glycol-2-carbonate, known by the trade name of CR 39, a hermosettable material, with addition thereto of an appropriate catalyst such as isopropyl percarbonate or benzoyl peroxide, polymerizing when slowly and gradually heated to 90° C. It should be distinctly understood however that various other thermosetting resins may be used in carrying out the invention.

FIG. 1 illustrates in the chart A, the heating cycle of the above specified allyl carbonate, and in chart B the corresponding shrinkage sustained by the material during polymerization. In both charts the abscissae are time of treatment $t$. It will be apparent that the monomer is first maintained two hours at a temperature of 48° C. thereby causing gelation as indicated at G, with a low contraction of about 4%. The temperature T is progressively raised, first slowly then more rapidly towards the end of the heating period, up to a final value of 90° C., thereby causing polymerization at P. The polymer is then cooled to 60° C. at which point the mold stripping operation can be performed as indicated at D.

It will be seen that during the polymerizing process the material undergoes a contraction R amounting to as much as about 14%.

In order to overcome the objectionable effects of such contraction or shrinkage, according to this invention a mold of the type illustrated in FIG. 2 is used. This mold comprises a pair of mold sections 10 and 11 made of quenched glass, and if necessary, hardened and polished after quenching, the sections being interconnected by an annular seal 12 and held in position by a resilient clamping device 13.

Each element 10 or 11 has parallel faces and is about 4 mm. in thickness. That face which is to engage the lens is optically finished in accordance with conventional procedure. The seal is made from a plastic composition having a softening curve of such gradual slope as to provide ample compensation for the shrinkage of the thermosetting material occurring as indicated by the curve R.

The mold filled with thermosetting monomer resin 14 is placed in an oven and undergoes the temperature cycle according to curve T in FIG. 1. As the material polymerizes, it simultaneously contracts in accordance with the curve R, and the seal 12 concurrently softens and thus allows the mold walls to move inward to compensate for the contraction of the material at the periphery of the lens. It has been found that the different amount of contraction occurring at the center of the lens is compensated for by the inherent resiliency of the element 10, which yields and deforms in such a way as at all times to ensure that contact is present between the mold walls and the lens.

After the material has polymerized and cooled (point D of the curve) the clamp 13 and the seal 12 are removed and the elements 10 and 11 are moved apart so as to strip the lens from its mold. The resulting lens 14 is ready for use.

The mold in FIG. 2 is of a type designed for molding converging meniscal lenses in which contraction is a minimum at the periphery adjacent the seal 12 and is a maximum at the center.

A similar arrangement is applicable to diverging meniscal lenses, as shown in FIG. 3, wherein the same components will be recognized including the quenched glass elements 10 and 11, seal 12 and clamp 13. With this shape of lens however, the contraction is greatest peripherally and lowest centrally of the lens. With such increased contraction it may sometimes be found difficult to maintain the requisite air-tightness of the mold. A two-stage procedure may then be used.

With the mold assembled and filled as shown in FIG. 3, the assembly is introduced into the oven and is allowed to remain therein until termination of the gelling period G (FIG. 1). The thermosetting material, when setting into a gel, retracts a limited amount of about 4% and this amount is readily taken up by the yielding seal 12.

At this stage the material undergoing polymerization is plastic enough so that it does not require the mold to assume a corresponding deformation and, moreover, it is firmly bonded to the wall surfaces of the mold so as to maintain an air-tight condition around the mold. The mold assembly is the nremoved from the oven and the clamp 13 and seal 12 are both removed. Around the side edge surface 15 of the lens thus uncovered (FIG. 4), a drop of allyl carbonate liquid monomer is applied and allowed to spread into a film forming a continuous thin annular meniscus 16 as shown in FIG. 4. The mold assembly thus conditioned is put back into the oven to complete the treatment. The thin mold walls 10 and 11 will then conform resiliently to the shrinkage of the material, while the coating film 16 prevents the ingress of air.

The procedure thus described is not restricted to the production of diverging meniscal lenses. While it is especially desirable in connection with lenses of this type it may be used in the manufacture of other types of lenses such as converging meniscal for example, as will be described presently.

The layer 16 spread over the side edge surface of the gelled but as yet unpolymerized lens may comprise substances different from the particular substance from which the lens is made. It has been found however that using the monomer of the resin itself as the protective layer is advantageous in that it averts a tendency for the different constituents in the lens to migrate and thus avoids the risk of decomposition and/or damage to the lens. Since the monomer coating 16 remains in contact with the surrounding air, it will not polymerize completely, and thus imparts to the peripheral portions of the lens itself a softening action which is beneficial in that it contributes to maintaining contact between the lens 14 and mold walls 10 and 11.

It has been indicated above that in using a mold of the kind above described the mold elements would deform to a different degree in accordance with their curvature. In practice however only the less highly curved portion will actually deform to a substantial extent while the remaining portions of the lens will be practically undeformed. In FIG. 2 for example the convex portion 10 of the mold will alone assume the entire deformation, and in FIGS. 3 and 4 the concave portion 11 will.

One desirable embodiment of the invention relies on the above finding and comprises providing simultaneously and in a single step, two complementary lenses the one converging meniscal and the other diverging maniscal, as shown in FIG. 5. The mold then comprises three portions 17, 18 and 19 each of uniform thickness. The least-curved part 18 is polished to an optical finish on both faces. The three mold elements are assembled by means of a two-part seal 20 and 21 having annular interfitting surfaces. The seal is made from a composition adapted to soften in proportion to the contraction of the thermosetting material. With such a three part mold two lenses 22 and 23 are produced in a single molding step, whereas producing the two lenses separately would require four mold elements. Thus a saving in labor and in tooling is simultaneously effected.

It will be understood that the procedure described above in connection with FIG. 4 is applicable to the double-mold assembly shown in FIG. 5, i.e. the double seal 20–21 may be removed after the gelling stage and a monomer protective film applied around the lens periphery.

The above described operating procedure is successfully applicable in the production of double lenses including astigmatic lenses or toroidal-surface lenses.

Having described my invention, I claim:

1. A method of manufacturing ophthalmic lenses of thermosetting resin having a thickness which varies from the center to the periphery thereof, comprising introducing liquid monomeric resin into a mold constituted by two plates, at least one of said plates being a thin plate of quenched glass having parallel opposite faces, said plates having the configuration of the corresponding face of the lens to be produced, the mold being bordered edgewise by a quantity of flexible material, heating the mold until the resin gels, removing said flexible material from the periphery of the gelled resin, applying a layer of said monomeric resin to the exposed periphery of the gelled resin, heating the mold until the resin polymerizes to form a solid lens, and removing the plates from the lens.

2. A method of manufacturing ophthalmic lenses of thermosetting resin having a thickness which varies from the center to the periphery thereof, comprising introducing a liquid monomeric resin consisting essentially of allyl diglycol carbonate into a mold constituted by two plates, at least one of said plates being a thin plate of quenched glass having parallel opposite faces, said plates having the configuration of the corresponding face of the lens to be obtained, the mold being bordered peripherally by a quantity of flexible material, applying mechanical pressure to the plates on opposite sides of the mold in directions toward each other, heating the assembly to about 48° C. for about tow hours until the resin has gelled, removing said flexible material from the periphery of the gelled resin, coating the exposed periphery of the gelled resin with a layer of said monomeric resin, heating the mold for about twelve hours at a temperature which is gradually increased to about 90° C. to thermoset the resin, cooling the mold to about 60° C., and removing said plates from the thermoset resin.

3. A method as claimed in claim 2, in which the heating, after said coating, is conducted in the substantial absence of mechanical pressure on opposite surfaces of said plates.

4. A method as claimed in claim 1, in which substantial mechanical pressure is applied normal to the outer side of said at least one plate during heating prior to said removal of said flexible material, and said substantial pressure is relieved during heating after said coating with monomeric resin.

5. A method of manufacturing ophthalmic lenses of thermosetting resin, comprising heating a lens-shaped body of liquid monomeric resin with its edges confined by solid dam material, between a pair of mold plates until the liquid gels, removing said dam material to expose the edges of the gelled material, coating the edges of the gelled material with further said liquid monomeric resin, heating the mold until the resin polymerizes to form a solid lens, and removing the mold plates from the lens.

6. A method as claimed in claim 5, in which said liquid monomeric resin is allyl diglycol carbonate.

7. A method of manufacturing ophthalmic lenses of thermosetting resin, comprising establishing a lens-shaped body of liquid monomeric resin in a mold which is sealed against communication with the ambient atmosphere and at least one wall of which mold is constituted by a thin plate of quenched glass having parallel opposite faces, and heating said body past gellation to polymerization, said thin wall deforming inwardly against the shrinking polymerizing resin.

8. A method as claimed in claim 7, and applying mechanical pressure normal to said thin wall during gellation and relieving said mechanical pressure during polymerization subsequent to gellation.

References Cited by the Examiner
UNITED STATES PATENTS

| | | | |
|---|---|---|---|
| 2,390,129 | 12/1945 | Shobert | 264—336 |
| 2,542,386 | 2/1951 | Beattie | 264—1 |
| 2,579,596 | 12/1951 | Minter et al. | 264—85 |
| 3,038,210 | 6/1962 | Hungerford et al. | 264—1 |

ALEXANDER H. BRODMERKEL, *Primary Examiner.*